United States Patent
Steele et al.

(10) Patent No.: US 6,738,010 B2
(45) Date of Patent: May 18, 2004

(54) METHOD AND SYSTEM FOR DETERMINING AIR TURBULENCE USING BI-STATIC MEASUREMENTS

(75) Inventors: Daniel Walter Steele, Clay, NY (US); Joseph L. Chovan, North Syracuse, NY (US)

(73) Assignee: Lockheed Martin Corporation

( * ) Notice: Subject to any disclaimer, the term of this patent is extended or adjusted under 35 U.S.C. 154(b) by 0 days.

(21) Appl. No.: 10/357,626

(22) Filed: Feb. 4, 2003

(65) Prior Publication Data

US 2003/0210169 A1 Nov. 13, 2003

Related U.S. Application Data

(63) Continuation-in-part of application No. 10/067,154, filed on Feb. 4, 2002, now Pat. No. 6,590,520.

(51) Int. Cl.[7] .............................................. G01S 13/95
(52) U.S. Cl. .................................................... 342/26
(58) Field of Search ..................... 342/26, 460, 179; 340/968

(56) References Cited

U.S. PATENT DOCUMENTS

| | | | | |
|---|---|---|---|---|
| 3,955,071 A | * | 5/1976 | Lambregts ..................... | 701/14 |
| 4,728,951 A | * | 3/1988 | Johnson et al. .............. | 340/968 |
| 5,053,767 A | * | 10/1991 | Zweifel et al. .............. | 340/968 |
| 5,220,322 A | * | 6/1993 | Bateman et al. ............. | 340/970 |
| 6,188,330 B1 | * | 2/2001 | Glover ........................ | 340/968 |
| 6,590,520 B1 | * | 7/2003 | Steele et al. ................. | 342/26 |

FOREIGN PATENT DOCUMENTS

EP          235963 A2   *   9/1987

OTHER PUBLICATIONS

"Turbulence assessment and decision making on the flight deck and in the cabin", Bass, E.J.; Digital Avionics Systems Conference, 1999. Proceedings. 18th, vol.: 1/17 pp. vol. 1, Nov. 1999 pp.: 4.A.4–1—4.A.4–8.*

"Methods of obtaining offshore wind direction and sea–slate data from X–band aircraft SAR imagery of coastal waters", Mastin, G.; Harlow, C.; Huh, O.; Hsu, S.; Oceanic Engineering, IEEE Journal of, vol.: 10 Issue: 2, Apr. 1985 pp.: 159–174.*

* cited by examiner

*Primary Examiner*—John B. Sotomayor
(74) *Attorney, Agent, or Firm*—Duane Morris LLP

(57) ABSTRACT

A method and system for determining atmospheric disturbances or turbulence is disclosed. The system includes a plurality of sensor arrays, including at least one sensor element, distributed in a predetermined manner. Each of the sensor elements is in communication with a corresponding receiving system that is operable to receive and process energy received from the aircraft. A determination is then made regarding air turbulence by determining a rate of change of signal phase among selected sets of signals received at the receiving systems. A turbulence map is then determined from the determined rate of change of the phase and the angle of the received signal. When the rate of phase change exceeds known levels an indication of turbulence is made.

10 Claims, 14 Drawing Sheets

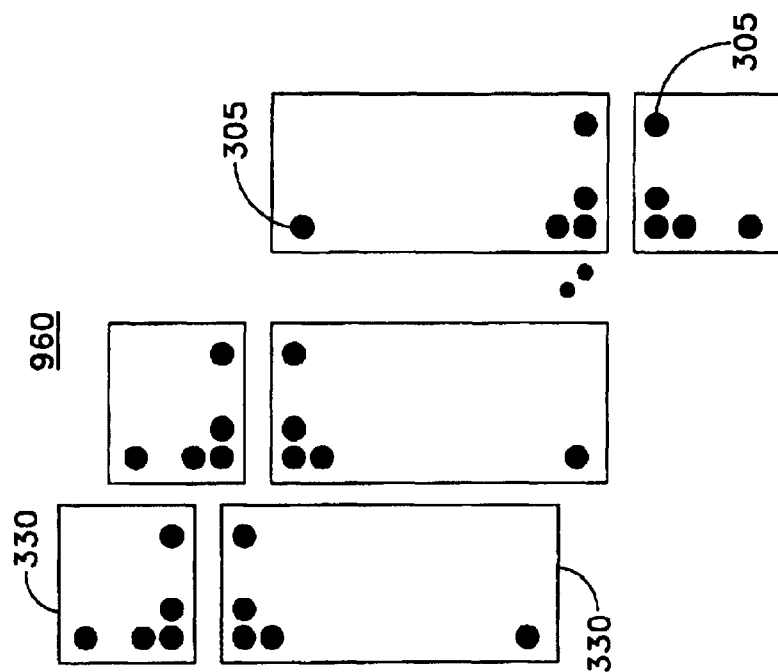
FIG. 9d
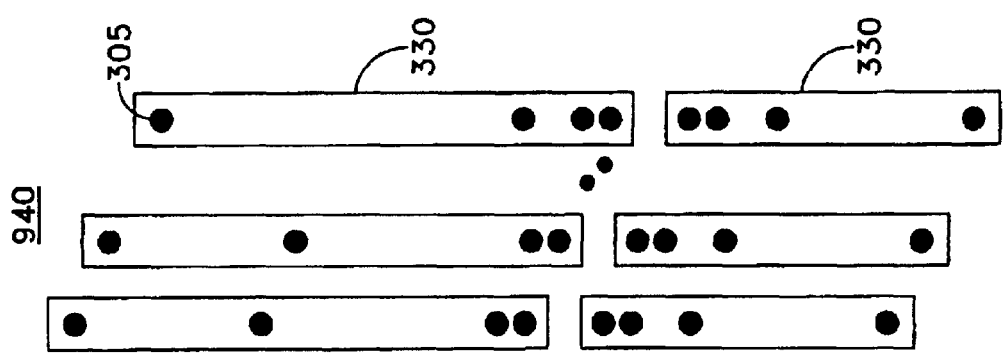
FIG. 9c
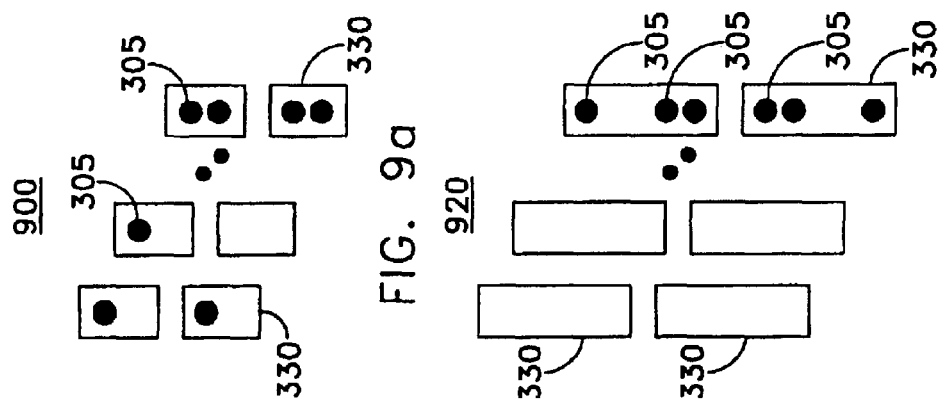
FIG. 9a
FIG. 9b

METHOD AND SYSTEM FOR DETERMINING AIR TURBULENCE USING BI-STATIC MEASUREMENTS

CLAIM FOR PRIORITY

This application is a continuation-in-part of patent application Ser. No. 10/067,154 filed Feb. 4, 2002, now U.S. Pat. No. 6,590,520 entitled METHOD AND SYSTEM FOR DETERMINING AIR TURBULENCE USING BI-STATIC MEASUREMENTS.

FIELD OF THE INVENTION

This invention is related to the detection of air turbulence and more specifically, to a method and system for determining air turbulence using bi-static measurements.

BACKGROUND OF THE INVENTION

In air travel, the most hazardous phase that an aircraft experiences is the landing or takeoff. In these phases, an aircraft is vulnerable to unexpected changes in the surrounding environment. For example, wind shears or other sudden or violent changes in the direction of the wind can cause a misalignment of the aircraft with respect to the runway. Furthermore, sudden drops in air pressure can cause the aircraft to suddenly lose altitude at a time when excess altitude is not available.

In addition to natural changes in the surrounding environment, aircraft landings and takeoffs also create vortexes or wake disturbances in the environment behind the aircraft that may affect the operation of a next and subsequent aircraft. Minimum required distances between aircraft have been established in order to reduce the effects of the vortex on the next or subsequent aircraft, hence, improving their safety However, such required minimum distances are set to accommodate worst-case conditions and are longer than necessary.

Knowledge of the disturbances or turbulence in the aircraft's surrounding environment can be used to improve aircraft safety and can also be used to reduce the minimum distance needed between aircraft, thus, increasing airport efficiency.

Hence, there is a need for determining disturbances or turbulence in the atmosphere surrounding an aircraft. In one aspect, knowledge of wake disturbances in the area around the ends of aircraft runways is important. In another aspect, knowledge of wake disturbance immediately ahead of an aircraft is similarly important.

SUMMARY OF THE INVENTION

A method for determining atmospheric disturbances or turbulence preceding an aircraft or induced by an aircraft is disclosed. The method includes receiving a signal from a plurality of sensor arrays, each including at least one sensor element, distributed in a predetermined manner. Each of the sensor elements is in communication with a corresponding receiving system that is operable to receive and process electromagnetic energy that is emanating from an approaching or departing aircraft. A determination is then made regarding air or wake turbulence by determining a rate of change of signal phase among selected sets of signals received at the receiving systems. A turbulence map is then determined from the determined rate of change of the phase and the angle of the received signal. When the rate of phase change exceeds known levels an indication of turbulence is made. In another aspect of the invention, each of the sensor arrays can include a plurality of sensor elements, which may be used to determine a precise angle of arrival of the received signal. In still another aspect of the invention, sensor arrays may be located on-board an aircraft to monitor turbulence immediately before it.

BRIEF DESCRIPTION OF THE FIGURES

FIGS. 9a–9d illustrate exemplary placements of sensor elements in accordance with the principles of the present invention;

FIG. 12 illustrates a second embodiment of an exemplary air turbulence system in accordance with the principles of the invention; and.

Figure 1:
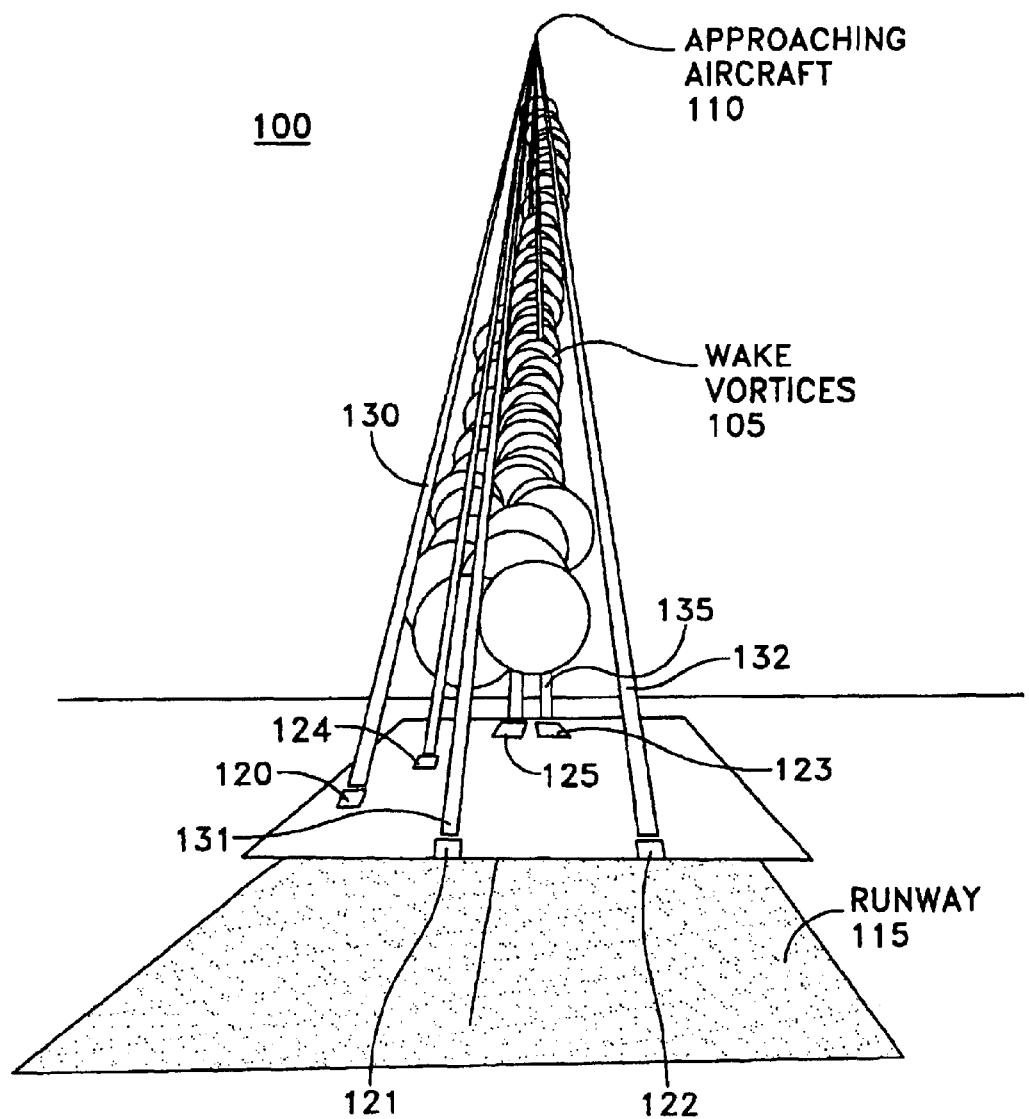
FIG. 1 illustrates a perspective view of aircraft approaching a runway further illustrating an exemplary distribution of sensor arrays in accordance with the principles of the invention.

It is to be understood that these drawings are solely for purposes of illustrating the concepts of the invention and are not intended as a level of the limits of the invention. It will be appreciated that the same reference numerals, possibly supplemented with reference characters where appropriate, have been used throughout to identify corresponding parts.

DETAILED DESCRIPTION OF THE PRESENT INVENTION

FIG. 1 illustrates a perspective view 100 of an exemplary air turbulence, or vortex column 105 immediately forward of an aircraft 110 approaching runway 115. FIG. 1 may similarly illustrate a perspective view of an air turbulence or vortex column induced by a departing aircraft. In either aspect of the invention, the illustrated ground based sensor arrays and corresponding receiving systems 120, 121, 122, 124, and 125 are positioned in locations at an end of runway 115 to detect and determine air turbulence in the vicinity of the runway end. While only five sensor arrays/receiving systems 120–125 are shown in the illustrated example, it will be appreciated that the system disclosed may be easily expanded to include any number of receiving systems. Furthermore, while the sensor arrays/receiving systems 120–125 are shown in the example co-located in the vicinity of the runway, it will be appreciated that the sensor arrays and corresponding receiving systems may be remotely located. In this case, corresponding receiving systems may be located at one or more central locations and connected to a corresponding sensor array through a wired or wireless network. The allowable distance between sensor array and corresponding receiving systems as would be known depends upon factors such as antenna gain, signal strength, receiver sensitivity, signal amplification, etc.

Returning now to FIG. 1, the illustrated sensor arrays/ receiving systems 120–125 detect electromagnetic energy that originates or emanates from approaching or departing aircraft 110 and provides the received signal energy to a corresponding receiving system for isolation of a desired signal. A received signal path length, illustrated as 130–135, between aircraft and sensor array/receiving systems depends on the position of aircraft 110, the locations of sensor array/receiving systems, 120–125, and the spatial angle between aircraft 110 and the sensor array.

Figure 2B:
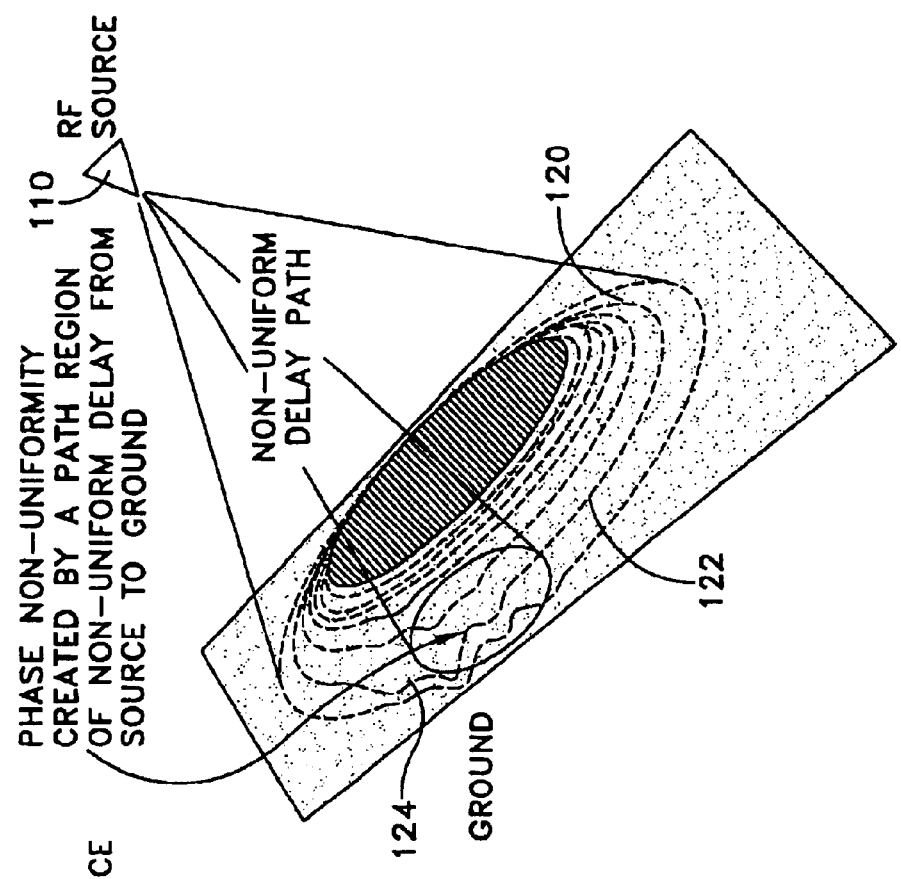
FIGS. 2a–2b illustrate phase changes in non-turbulent and turbulent conditions, respectively.
Figure 2A:
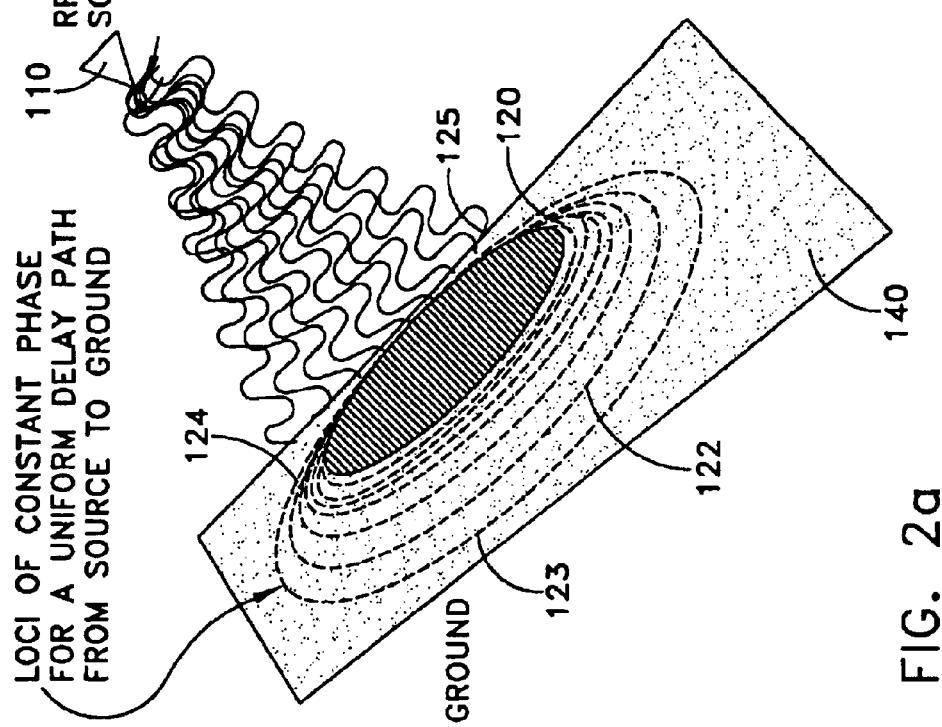

FIG. 2a illustrates the constant phase of the signals received at array plane 140 containing array sensors/ receiving systems 120–125 when no turbulence exists in the signal path between the aircraft and array sensors/receiving systems 120–125. The signal received at any of the receiving systems may be represented as:

$$S_r = K \sin(\omega t + \phi) \quad [1]$$

wherein
- $S_r$ is the received signal;
- $K$ is a constant;
- $\omega t$ is representative of the transmitting frequency; and
- $\phi$ is representative of the phase angle induced by the path length between the aircraft and sensor array.

In the determination of the instantaneous received frequency of a dynamically moving target, the received signal frequency is further influenced by the well known principle of Doppler shift and is determined as $$S_r(t) = K \sin(\omega t + \phi(t)) \quad [2]$$

where
- $S_r(t)$ is the received signal as a function of time; and
- $\phi(t)$ is representative of the time variant phase angle induced by the changing path length.

FIG. 2b illustrates the non-uniform phase of signals traversing air turbulence existing between the aircraft 110 and plane 140 containing array sensors/receiving systems 120–125. Turbulence or atmospheric index of refraction variations are influenced by known changes in air pressure, temperature, and moisture. Aircraft vortices, in particular, produce changes in all three parameters. Changes in atmospheric refractive index in turn produce changes in propagation delay and direction that manifest themselves in terms of distortions in the received signal wavefront and phase. The received frequency is further influenced by the changing atmospheric conditions and may be determined as:

$$S_r(t) = K \sin(\omega t + \phi(t) + \tau(t)) \quad [3]$$

where
- $\tau(t)$ is representative of the time variant change in phase caused by changing atmospheric conditions.

Figure 3:
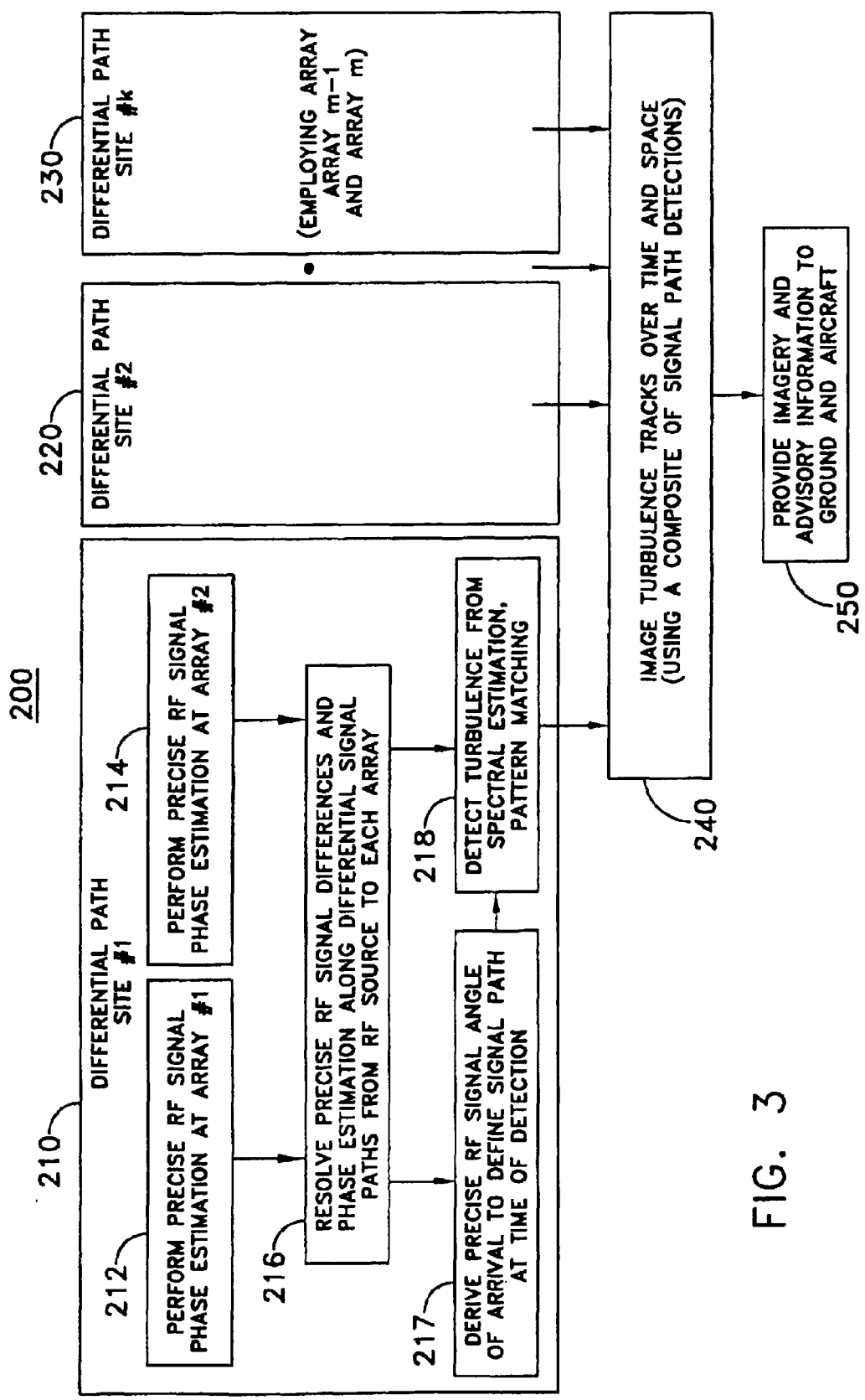
FIG. 3 illustrates an exemplary process flow for determining turbulence in accordance with the principles of the present invention.

FIG. 3 illustrates an exemplary process flow 200 wherein each of a plurality of differential path determinations, determined by illustrated processors 210, 220, 230 are provided to processor 240. Differential path processor 210, for example, determines an estimation of a signal phase at each of a plurality of sensor arrays. In this illustrative example, differential phase estimates are obtained using two sensor arrays. The phase estimates are then applied at processing module 216 to block 216 to resolve signal differences and determine phase estimates along differential signal paths to each sensor array. At processing block 217, an angle of arrival may be determined to define a signal path. The accuracy and precision of the determined angle of arrival depends on the number and position of sensor elements within each sensor array. At processing block 218, a level of turbulence is determined based on a spectral estimation of the rate of phase change along a defined signal path. At processing block 240 an image of turbulence in the region along the defined signal path is prepared from each of the determined differential path turbulence estimates. At processing block 250, an image of the turbulence estimates may be displayed to a ground and/or air based operator.

Figure 4A:
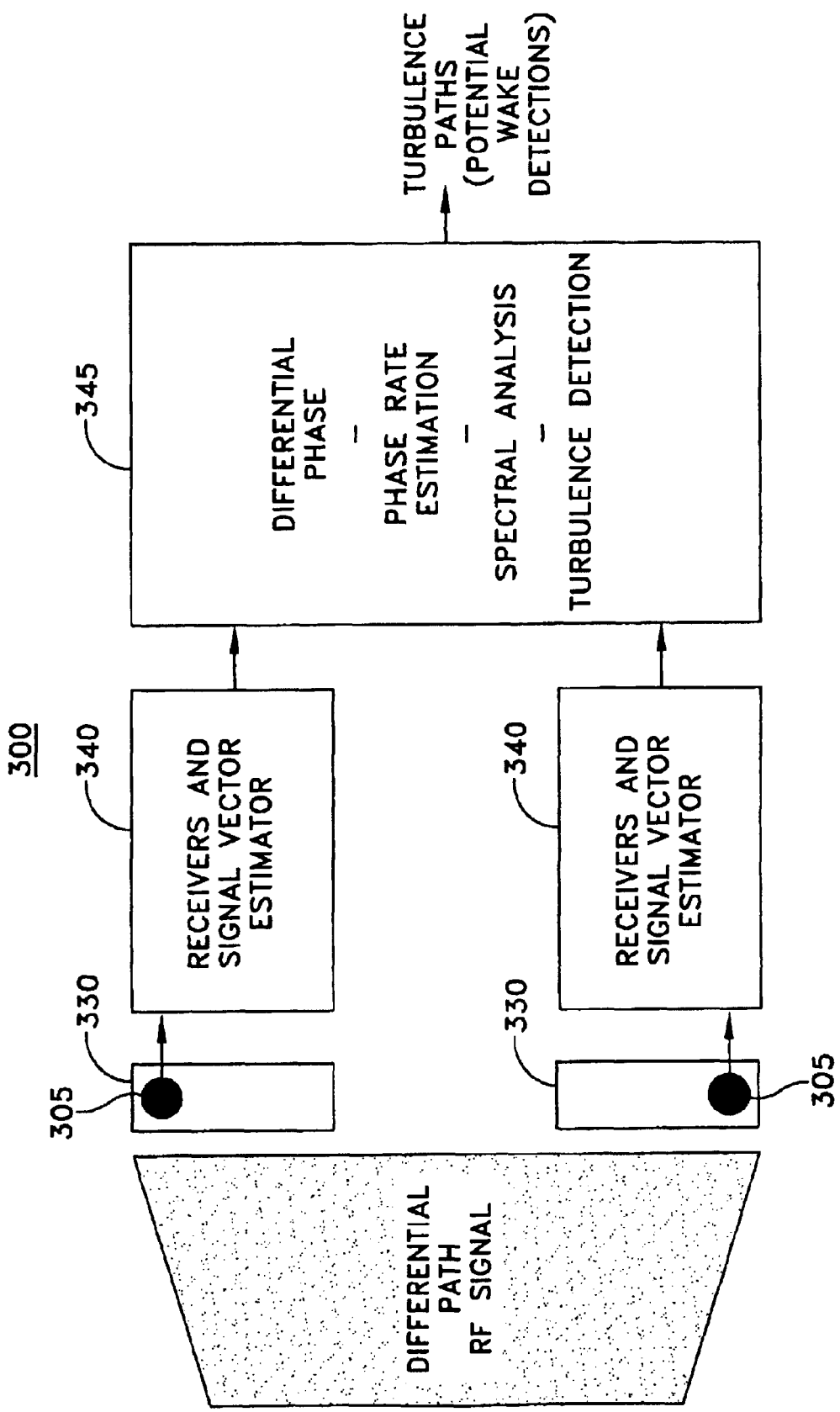
FIG. 4a illustrates a block diagram of an exemplary system configuration in accordance with the principles of the present invention.

FIG. 4a illustrates a block diagram of an exemplary air turbulence monitoring system 300 for detecting and determining air turbulence in accordance with the principles of the invention. In this exemplary system, a single sensor element 305 is shown contained within sensor array 330. Sensor elements are positioned to provide a determination of the phase of the received signal using known methods. In a preferred embodiment, the phase of the received signal is resolved unambiguously. Each of the plurality of sensor arrays 330 are further in communication with a corresponding receiving and signal vector estimator system 340, which provides a corresponding detected and estimated signal to processor 345. Processor 345 is operable to process the received signals and determine a differential phase, an estimate of phase rate, and potential turbulence and wake.

Receiving subsystems that receive and process electromagnetic signals originating or emanating from, in this case, a same source are well known in the art and need not be discussed in detail herein. The detected electromagnetic signals may be selected from an on-board signal, such as IFF, altitude transponder, navigation transponder, VHF radio, UHF radio, FLIR, weather RADAR, or a ground based signal, such as ground based RADAR, e.g., Air Traffic Control Radar Beacon System (ATCRBS). Furthermore, ultraviolet, visible, or infrared light sources, such as landing lights, reflected or sourced light are representative of electromagnetic energy that may also be used when received by sensor elements 305 and receiving systems operable to process such electromagnetic radiation.

Figure 4B:
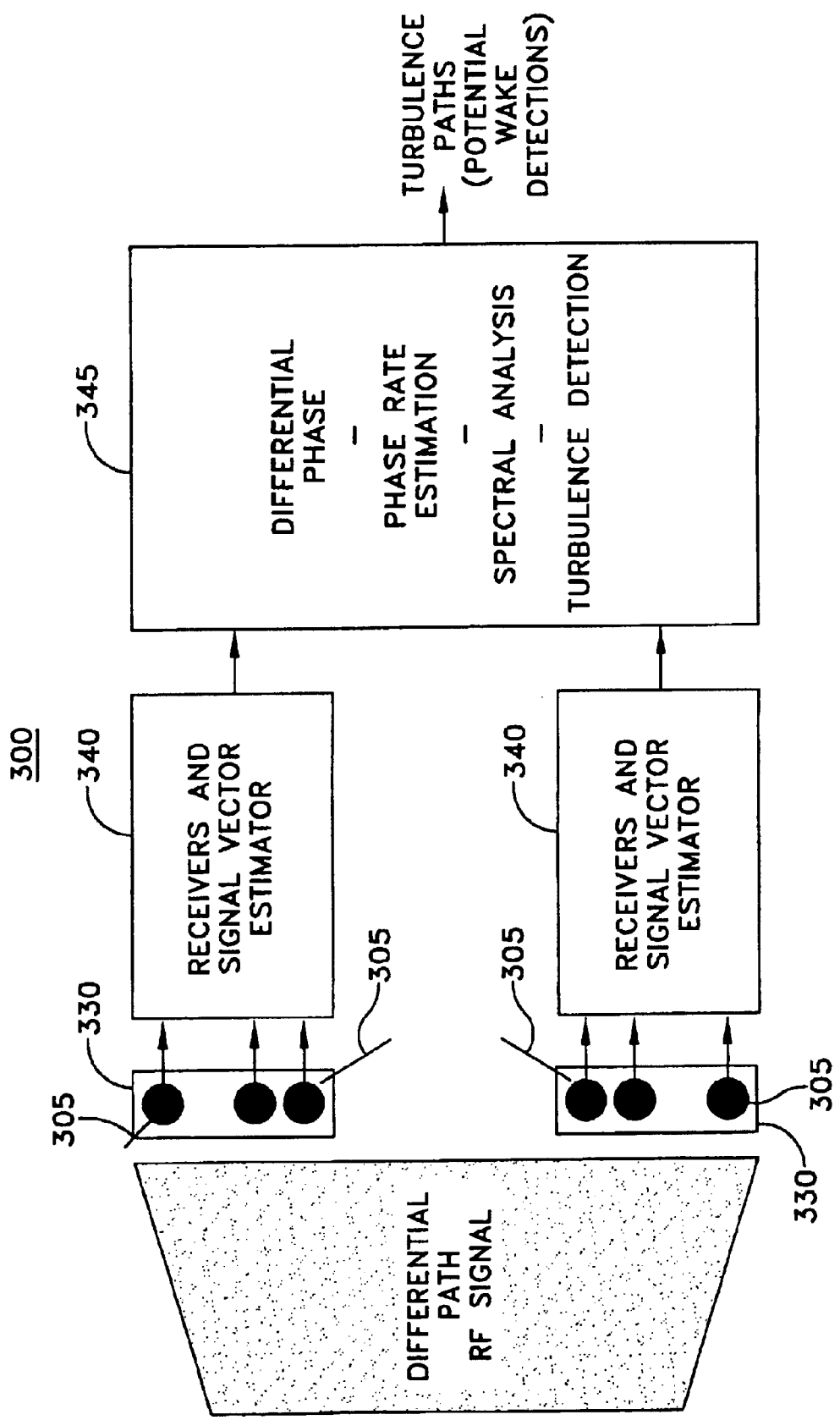
FIG. 4b illustrates a block diagram of a second exemplary system configuration in accordance with the principles of the present invention.

FIG. 4b illustrates a block diagram of a second and preferred aspect of the present invention. In this example, each of the sensor arrays 330 contains a plurality of sensing elements 305. In this case the plurality of sensing elements may be predeterminedly positioned to determine an angle of arrival of the received signal and a composite phase value for the signal received among the sensor elements. In a preferred embodiment of the invention, sensor elements 305 are positioned within each sensor array 330 using wellknown interferometric methodology for determining unambiguous signal angle of arrival.

Figure 5:
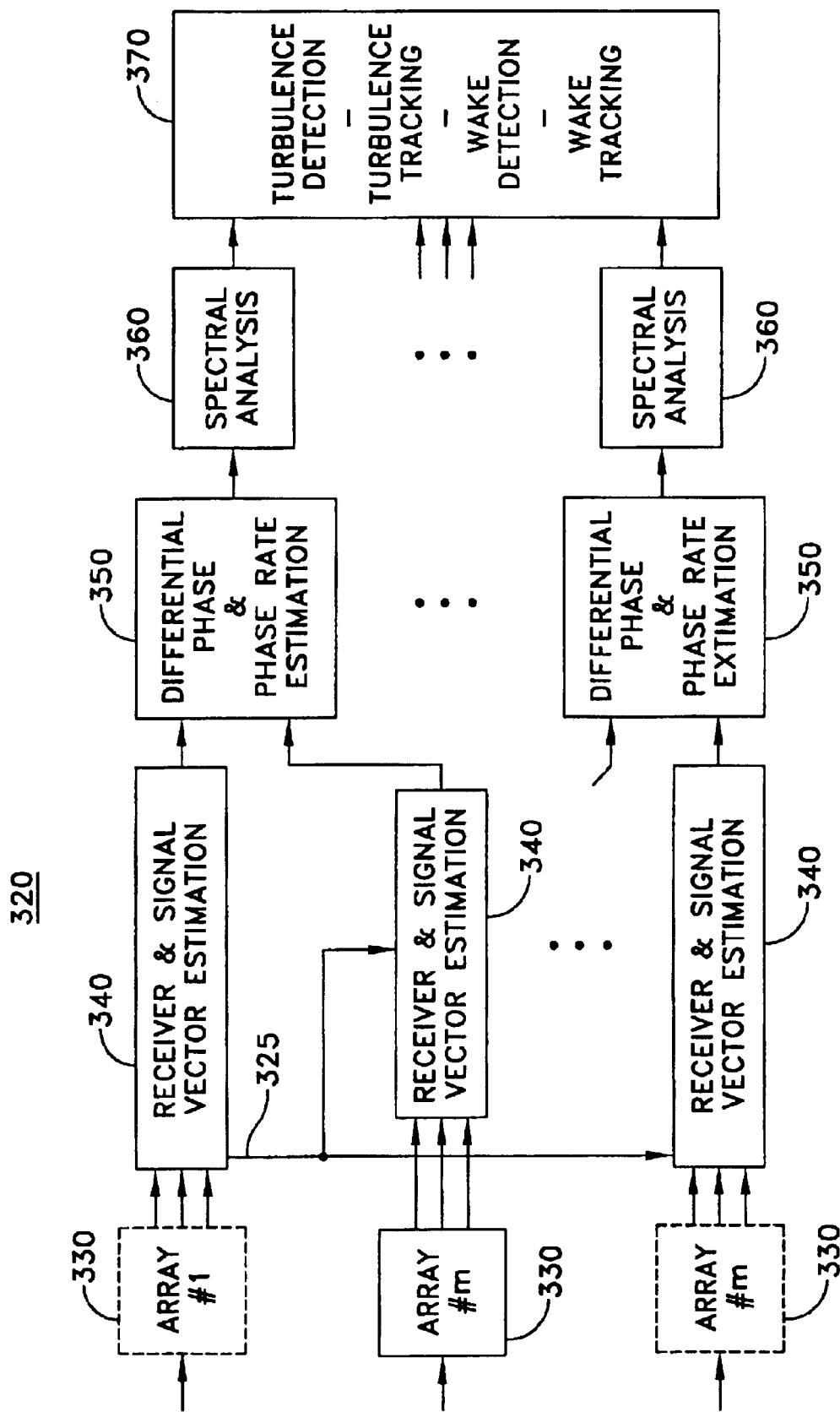
FIG. 5 illustrates a block diagram of an exemplary signal processing system in accordance with the principles of the present invention.

FIG. 5 illustrates a block diagram 320 of processor 345. In this illustrated block diagram received signals from each sensor element 305 within each sensor array 330 are provided to a corresponding receiver/signal estimator 340. Selected signals from receiver/signal estimator 340 are then provided to differential phase and phase rate estimator 350. The output of phase rate estimator 350 is then provided to spectral analyzer 365. The output of spectral analyzer 365 is then provided to processor 370. Processor 370 then determines turbulence and wakes based on the rate of change of the measured phase of the received signals. As will be appreciated the number of sensor arrays 330 and receiving systems 340 may be easily increased to any number of subsystems by incorporating additional subsystems in parallel without changing the scope of the invention.

As is further illustrated, a signal 325 is selected from at least one selected receiving system and is provided to each of the receiving/signal estimators 350. Signal 325 is then used as a reference signal to determine a phase measurement for each of the received signals. In a second aspect of the invention, a signal 325 from each receiving system may be provided to every other receiving system to determine phase measures with regard to different reference signals.

Figure 6:
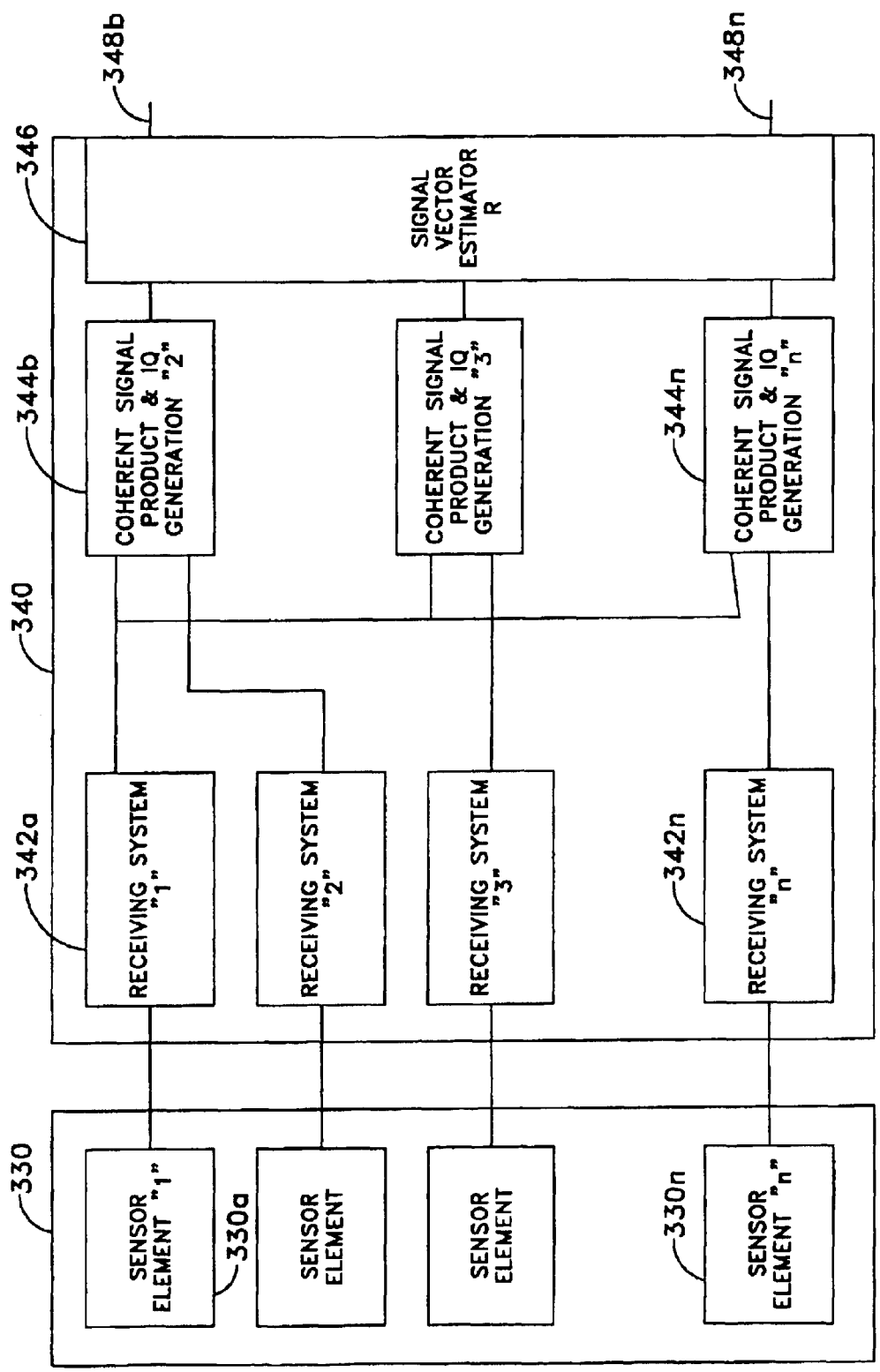
FIG. 6 illustrates a block diagram of an exemplary receiver/signal estimator as used in the present invention.

FIG. 6 illustrates a block diagram of an exemplary receiver/signal estimator 340. In this case, a plurality of sensor elements 330a, 330b, 330c, through 330n are contained within sensor array 330. Sensor elements 330a–330n preferably are distributed at locations with respect to one another to determine an unambiguous angle of arrival. Determination of unambiguous angle of arrival of a received signal may be determined using known methods, e.g., interferometric methods.

As illustrated, each sensor element 330a–330n provides a detected signal to a corresponding receiving system 342a–342n. Further, in the illustrated case, first receiving system 342a is selected as a reference signal source from which all other signals detected at sensor elements 342b–342n are processed. The processed signal of the selected reference receiver 342a and the signals detected by each of the remaining receiving systems 342b–342n are pair-wise applied to corresponding coherent signal product generators 344b–344n. For example, the output of receiving system 342b and reference signal 325 are applied to signal product generator 344b. Although the outputs of the receiving systems 342b–342n are depicted as being pair-wise applied to corresponding coherent signal product signal generators 344b–344n, it would be appreciated that any number of signals may be applied to a corresponding coherent signal product generator.

The output of each coherent signal product generator 344b–344n is then applied to a signal vector estimator processor 346. Signal estimator processor 346 determines refined signal vector values representative of the signals received by sensor elements in array 330. Further, each of the signals 348b–348n is represented as having an in-phase, "I" and quadraphase "Q" component. Signals 348b–348n may also be represented as in a matrix form having a determined amplitude and phase value.

Figure 7:
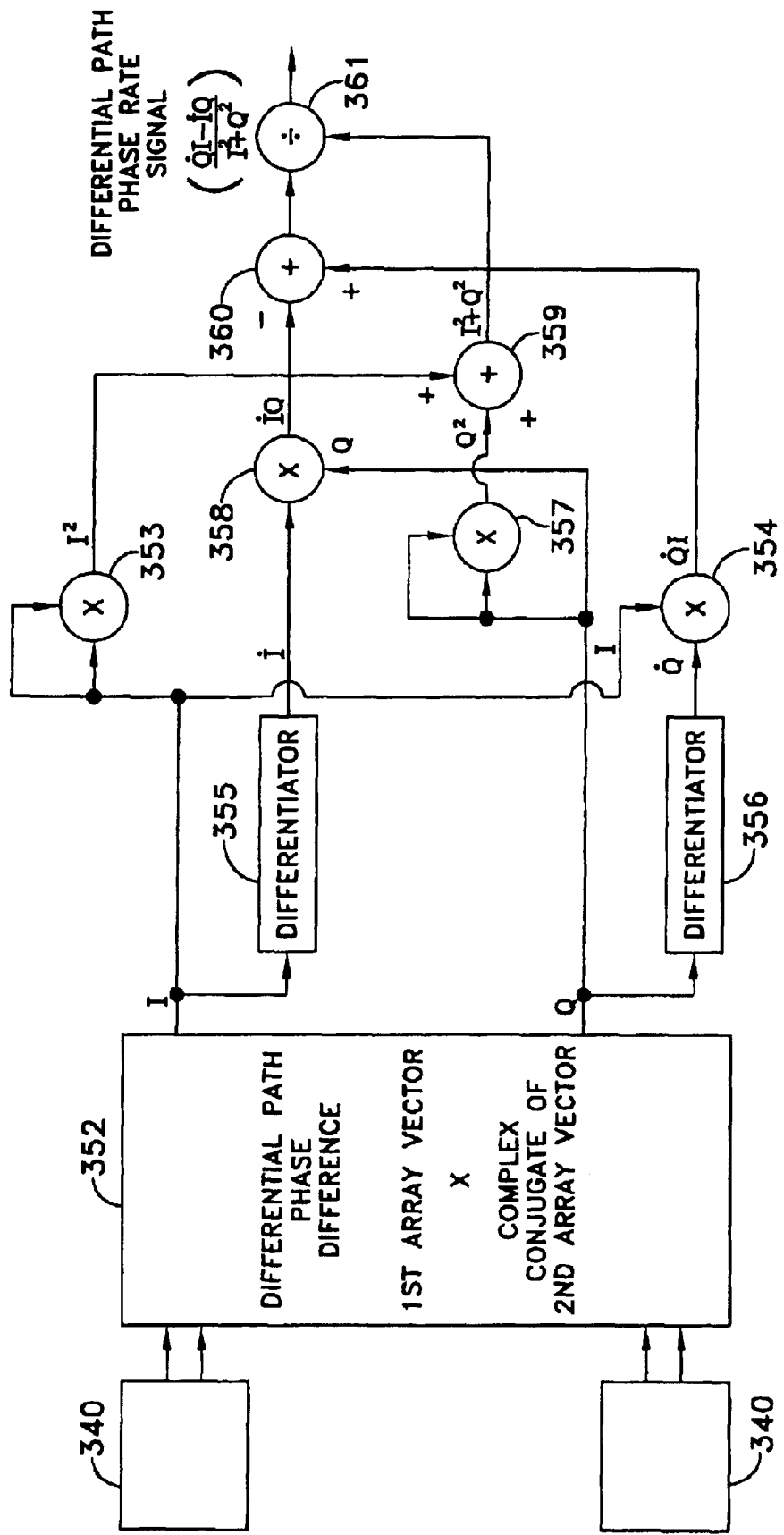
FIG. 7 illustrates a block diagram of an exemplary differential signal phase and phase rate estimator in accordance with the principles of the present invention.

FIG. 7 illustrates a block diagram of an exemplary differential phase and phase rate estimator 350. In this exemplary block diagram, each of the signal vectors 348b–348n of at least two signal estimators 340 are provided to differential path phase difference processor 352 to determine a differential path phase difference between the provided signal vectors. In a preferred embodiment, the resultant difference signal vectors are decomposed into their complex in-phase and quadrature-phase signal components, represented as I and Q respectively. The in-phase components of the provided signal vectors are provided concurrently to both inputs of multiplier 353, to differentiator 355 and to multiplier 354. The output of multiplier 353 is thus representative of the square of the I component. The output of differentiator 355 is thus representative of the derivative of the I component, represented as $\overset{\circ}{I}$. Similarly, the quadrature components of the provided signal vectors are provided to both inputs of multiplier 357, to differentiator 356, and to multiplier 358. The output of multiplier 357 is representative of the square of the quadrature component and the output of differentiator 356 is representative of the derivative of the quadrature component, represented as $\overset{\circ}{Q}$. The I and Q which are provided to multipliers 354 and 358, respectively, are then multiplied by corresponding differentiated Q and I signals, i.e., $\overset{\circ}{Q}$ and $\overset{\circ}{I}$, respectively. The difference of the outputs of multiplier 354 and 358 is then determined by subtractor 360. The square of the I and Q components are then provided to adder 359 to produce a signal representative of the sum of the square of the I and Q components, i.e., $I^2+Q^2$. The output of subtractor 360 and the square of the I and Q components is then provided to divider 361. A differential path phase rate signal may then be determined as:

$$\frac{Q\overset{\circ}{I} - I\overset{\circ}{Q}}{I^2 + Q^2} \text{ where } \overset{\circ}{I} \text{ and } \overset{\circ}{Q}$$

are first derivatives of in-phase and quadrature phase components of the provided signal vectors.

Differential phase, interferometer-receiving systems are preferably used for detecting phase rate changes. By computing the differential rate of phase change from at least two slightly differing paths between a common source and each of two interferometer receiving elements, the phase effects that are common to both paths are cancelled and, hence, the differences between paths is accentuated. The ability to measure the degree of differential phase fluctuations between at least pairs of signal paths and recorded histories of these fluctuations related to respective path geometries allows regions of fluctuations to be determined, tracked and mapped.

Figure 8:
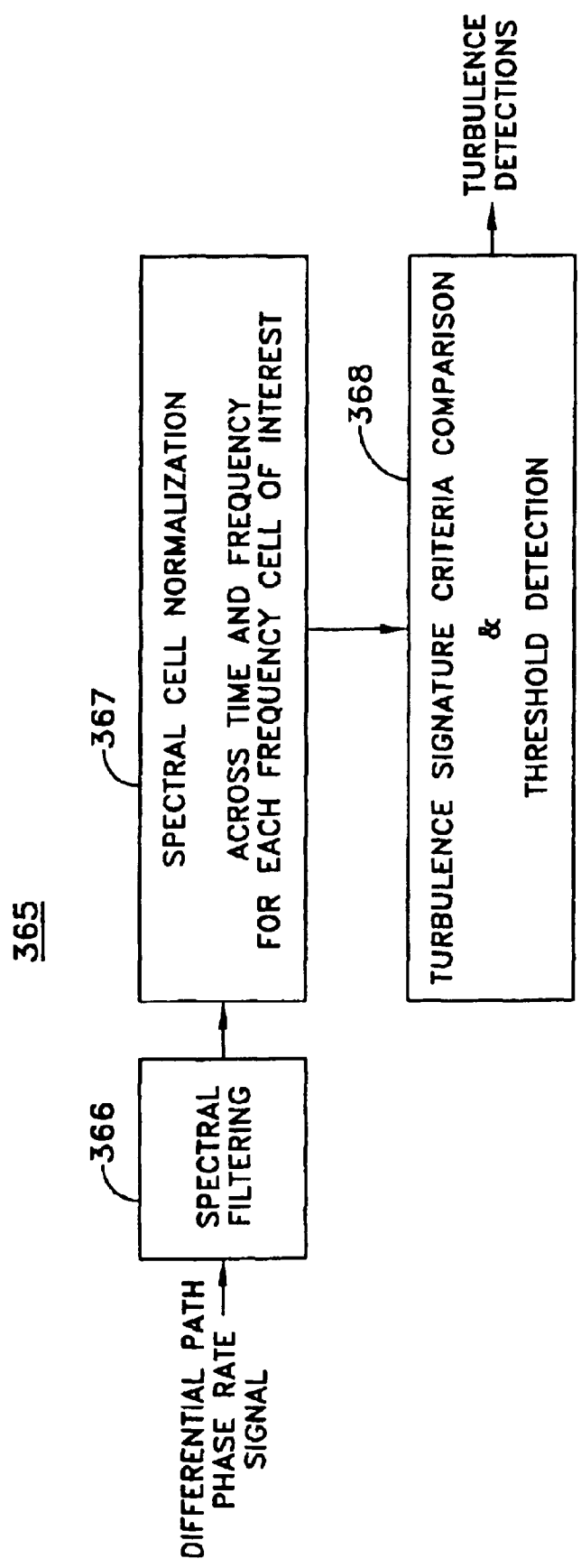
FIG. 8 illustrates a block diagram of an exemplary Wake spectral analyzer in accordance with the principles of the present invention.

FIG. 8 illustrates a block diagram of an exemplary wake spectral analyzer 365. In this example, a differential signal is applied to spectral filter 366. Spectral filter 366 separates the phase rate spectrum of a wake-induced phase values from the principally static non-wake phase values. In one aspect, a Fourier Transform or Fast Fourier Transform (FFT) may be implemented in the processing of spectral filter 366. The output of spectral filter 366 is applied to spectral cell normalizer 367, referred to as spectral cell normalization, which normalizes the determined differential signal across time and frequency. The output of normalizer 367 is then applied to turbulence threshold detector 368. The output of turbulence detector 368 is then applied to processor 370.

FIGS. 9a–9d illustrate exemplary sensor array configurations. FIGS. 9a–9c illustrate exemplary configurations wherein sensor elements are linearly positioned. FIG. 9d illustrates an array configuration wherein the sensor elements are positioned along two axii. More specifically, FIG. 9a illustrates a plurality of sensor arrays 900 containing two sensor elements 305 linearly aligned in each array. FIG. 9b illustrates a plurality of sensor arrays 920 wherein three sensor elements 305 are linearly aligned. In a preferred aspect, the positioning of sensor elements 305 is determined in accordance with well known interferometric methods. FIG. 9c illustrates a plurality of sensor arrays 940 having four sensor elements 305. As would be understood, as the number of sensor elements or the spacing between sensor elements increases, the ability to unambiguously determine angle of arrival and signal phase increases. FIG. 9d illustrates a plurality of two-dimensional sensor arrays 960 containing sensor elements 305 positioned in two dimensions. This position allows for an improved determination of the angle of arrival of the received signal. Although not shown, it would be understood that sensor elements may further be oriented or positioned in three dimensions to further improve the determination of received signal angle of arrival. While FIGS. 9a–9d illustrate exemplary positions of sensor elements, it is not intended that only those sensor element orientations shown are within the scope of the invention. Rather, any number of sensor elements or sensor element positions may be used without altering the scope of the invention.

Figure 10:
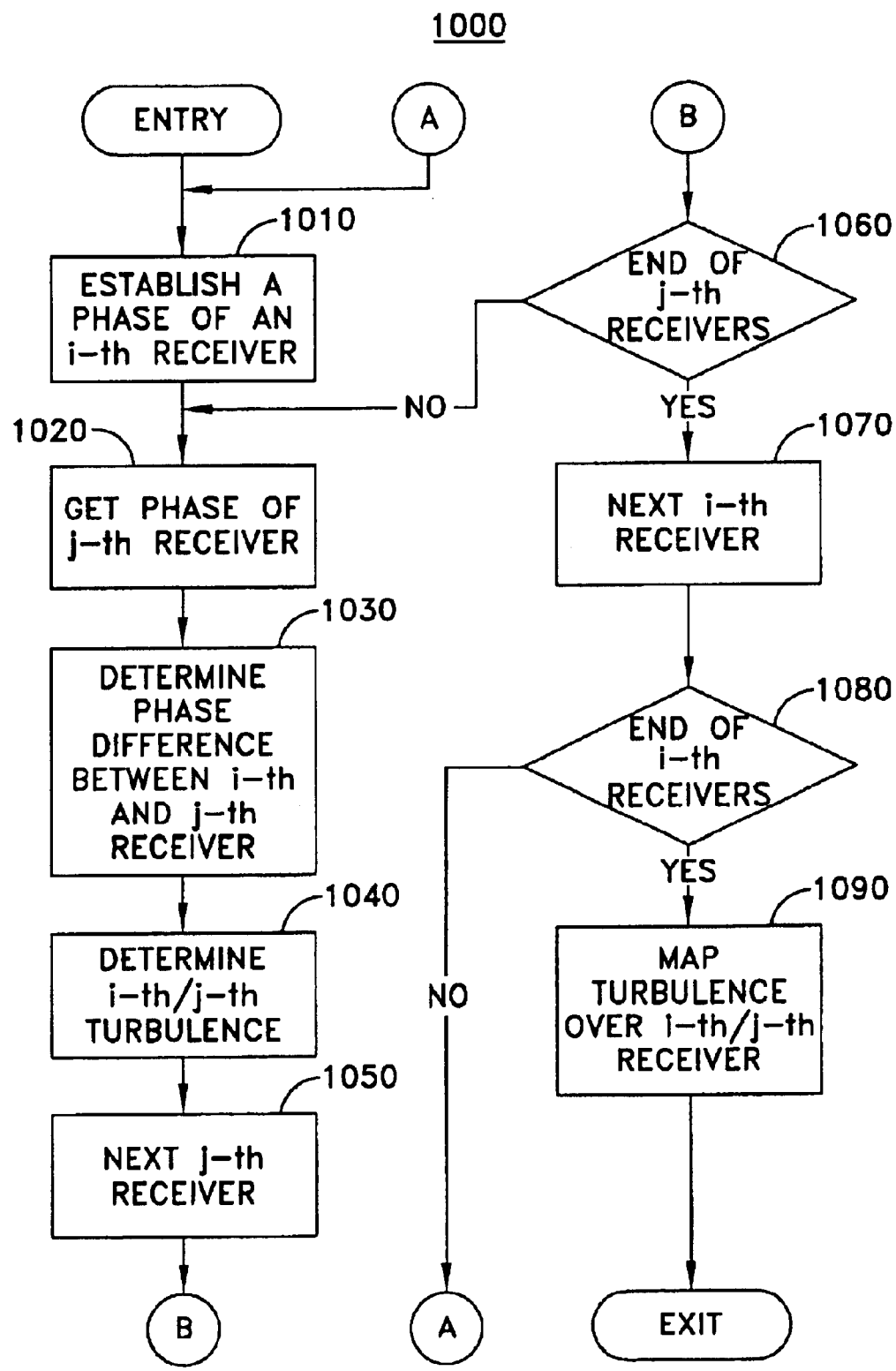
FIG. 10 illustrates a flow chart of an exemplary process for determining phase difference.

FIG. 10 illustrates a flow chart 1000 of an exemplary processing to determine air turbulence in accordance with the principles of the present invention. In this case, the phase of the signal received at an I-th receiving system is established as a reference phase signal, at block 1010. The phase of the signal received at a next or subsequent (j-th) receiving system is then obtained, at block 1020. The difference between the signal phases received at the selected i-th and j-th receiving system is then determined, at block 1030. A determination of the rate of change of the signal phase difference is then determined between the difference in phases at two known times or time periods at the I-th and j-th systems is made and stored at block 1040.

A next/subsequent receiving system is then selected, at block 1050. A determination is then made at block 1060 whether all j-th receiving systems have been selected. If the answer is in the negative then the phase of the next/subsequent receiving system is obtained at block 1020. Accordingly, the phase of the signal received at each next/subsequent receiving system is evaluated with regard to a selected reference signal phase from an I-th receiving system. In one aspect of the invention, if the answer at block 1060 is affirmative, then a map of turbulence over the I-th/j-th receiver system combinations may be determined at block 1090. As an example, in this aspect of the invention, a turbulence map may be determined based on phase measurement determinations using receiving systems combinations $1^{st}/2^{nd}$, $1^{st}/3^{rd}$, $1^{st}/4^{th}$, through $1^{st}/n^{th}$ receiving systems.

In a second aspect of the invention, and one that is illustrated in FIG. 10, if a the answer at block 1060 is in the negative, then a next I-th receiving system may be selected at block 1070. A determination is then made at block 1080 whether all the I-th receiving systems have been selected. If the answer is in the negative then the phase of the I-th receiving system is established as a reference at block 1010. The process of determining rate of phase change between the reference phase value at the selected I-th receiving system and the signals received at the j-th receiving system is repeated for selected I-th and j-th receiving systems.

If, however, the answer at block 1080 is affirmative, then a map of turbulence over the I-th/j-th receiver system combinations may be determined at block 1090. As an example, in this aspect of the invention, a turbulence map may be determined based on phase measurement determinations using receiving system combinations $1^{st}/2^{nd}$, $1^{st}/3^{rd}$, $1^{st}/4^{th}$, ..., $1^{st}/n^{th}$, $2^{nd}/3^{rd}$, $2^{nd}/4^{th}$, ..., $2^{nd}/n^{th}$, $3^{rd}/4^{th}$, ..., $3^{rd}/n^{th}$, etc. As would be appreciated, a determination of an air turbulence mapping may also be obtained from the phase difference of selected receiving systems.

Although the exemplary processing illustrated depicts determining rate of phase change between two same received signals, it would be appreciated that rate of phase change among three or more same received signals can also be determined and used in mapping the determined turbulence.

Figure 11:
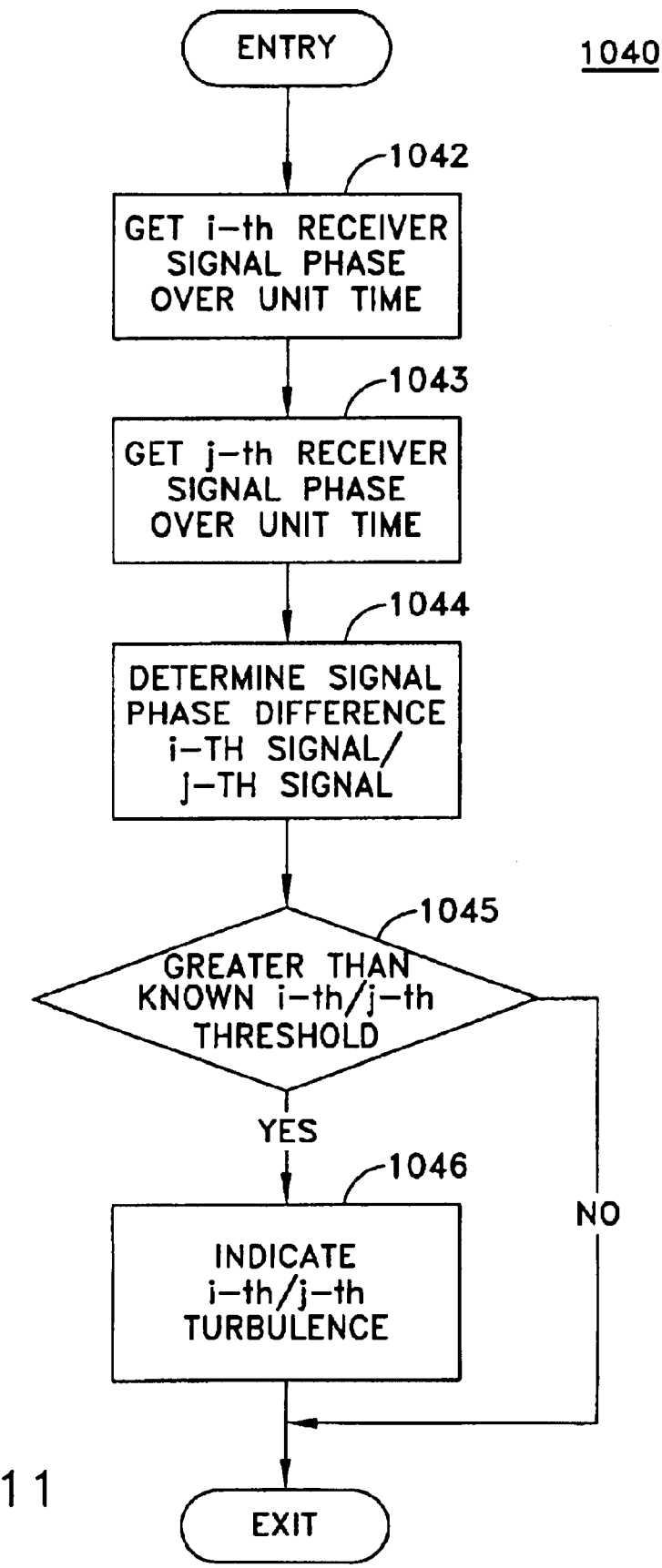
FIG. 11 illustrates a flow chart of an exemplary process for determining phase rate of change.

FIG. 11 illustrates a flow chart of an exemplary processing 1040 for determining rate of phase change between a signal received at an I-th receiving system and the signal received at a j-th receiving system. In one aspect of the invention, the instantaneous phase of the signal received at the I-th receiving system is determined at a first time, at block 1042 and the instantaneous phase of the signal received at the j-th receiving system is determined at a concurrent time, at block 1043. The difference between the two instantaneous phases at the first time is then determined at block 1044. The determined difference, at the first time, is then compared to an instantaneous phase difference obtained for the same received signal at a previous time at block 1045. When the difference in the instantaneous phase from a first time to a previous time exceeds a known limit, then an indication of turbulence may be recorded at block 1046. As would be appreciated, a known limit value may be independently associated with each receiving system combination. In another aspect of the invention, the rate of phase change over a known time period may be used to determine a measure of air turbulence. In this aspect of the invention, a measure of the phase change over a known time period is determined for the signal received at the i-th receiving system. For example, a measure of the signal phase change may be an average, a weighed average, a mean, a median, etc., of phase change over a selected time period. As would be understood, the determination of an average and weighted average, etc., must consider the 360/0 degree crossover of phase measurements. In still another aspect of the invention, a measure of phase change may be determined as a polynomial relation that provides a minimum mean square error of the signal phase data collected during the selected time period. A similar measure of phase change is determined over the selected time period for the signal received at the j-th receiving system. The rate of phase change may then be determined as the difference between the difference between the two polynomial relations at the two receiving systems over the first time period and the difference in the two polynomial relations representative of the two signal phases at the same receiving systems over a previous known period. When the rate of phase change from one time period to a previous time period exceeds a known limit, then an indication of turbulence is recorded. Methods of determining least square fit polynomials and operations on polynomial are well known in the art and need not be disclosed herein. As would be appreciated, selected time periods may be disjointed, wherein the phase data of one time period is independent of an adjacent period. Or the selected period may be a sliding period wherein current phase data replaces phase older data in a first in/first out mode.

Figure 12:
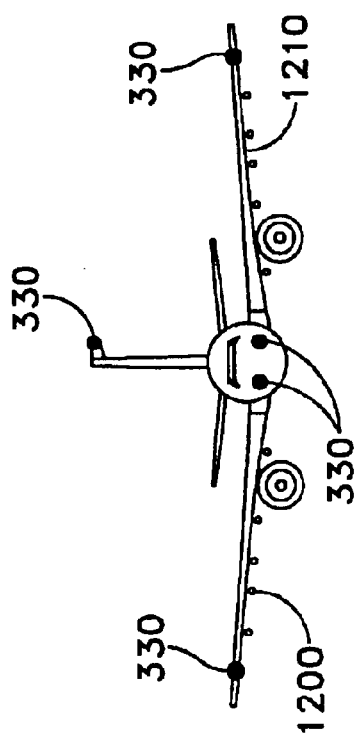
Figure 12:
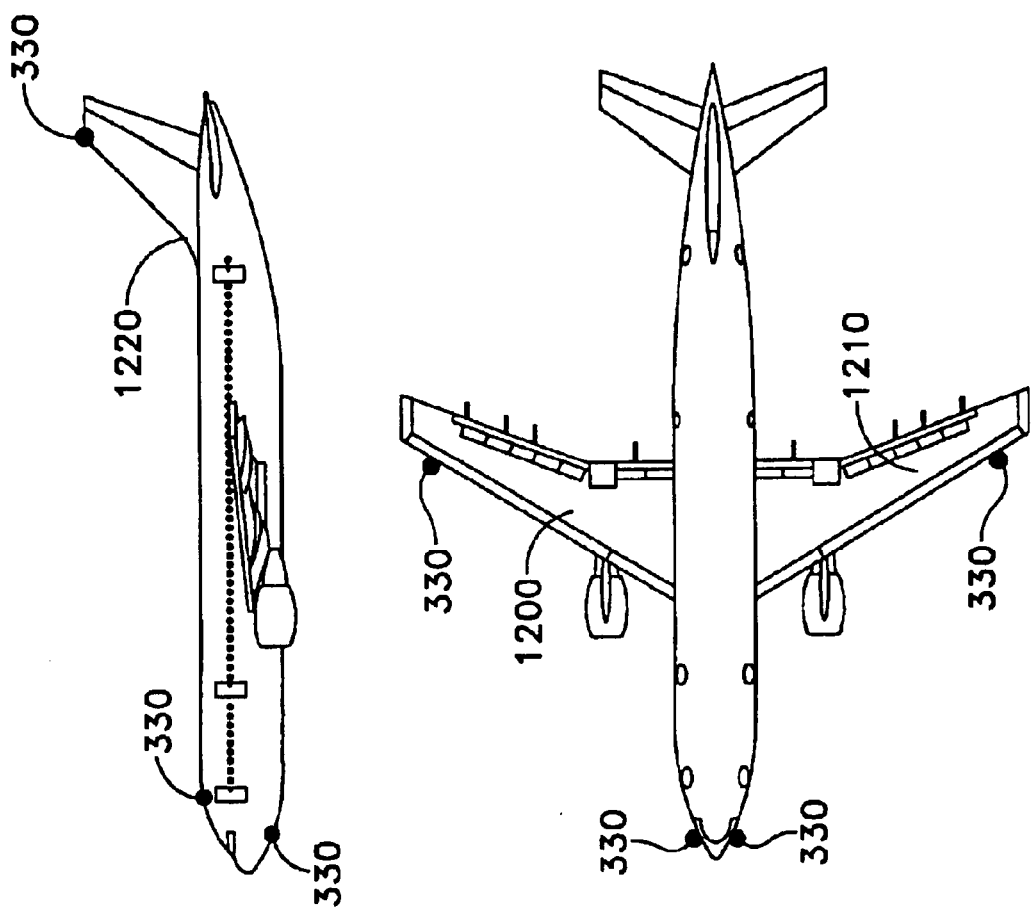

FIG. 12 illustrates a second embodiment of the present invention, wherein sensor arrays are distributed in predeterminedly located positions to detect and process electromagnetic signal energy immediately before aircraft 110. In this illustrative example, sensor arrays 350 are positioned in the aircraft nose and along the forward edge of each wing 1200, 1210. In still another aspect of the invention, a sensor array 350 may be mounted vertically, e.g., on the vertical stabilizer 1220, to provide a two-dimensional measure of turbulence 1220 immediately ahead of aircraft 110.

In one aspect of the invention, as shown in FIG. 1, each of the receiving systems includes an antenna that is positioned or directed in substantially a co-linear fashion with a direct signal path of a desired signal transmitted or reflected from the target aircraft. In this aspect, the main beam of the antenna pattern is directed or positioned in space to receive a substantially maximum level of energy from the desired signal. As would be appreciated, the receiving system antenna may also be movable to enable the receiving system to continuously receive a substantially maximum signal energy as the target aircraft continues along its flight path.

Figure 13:
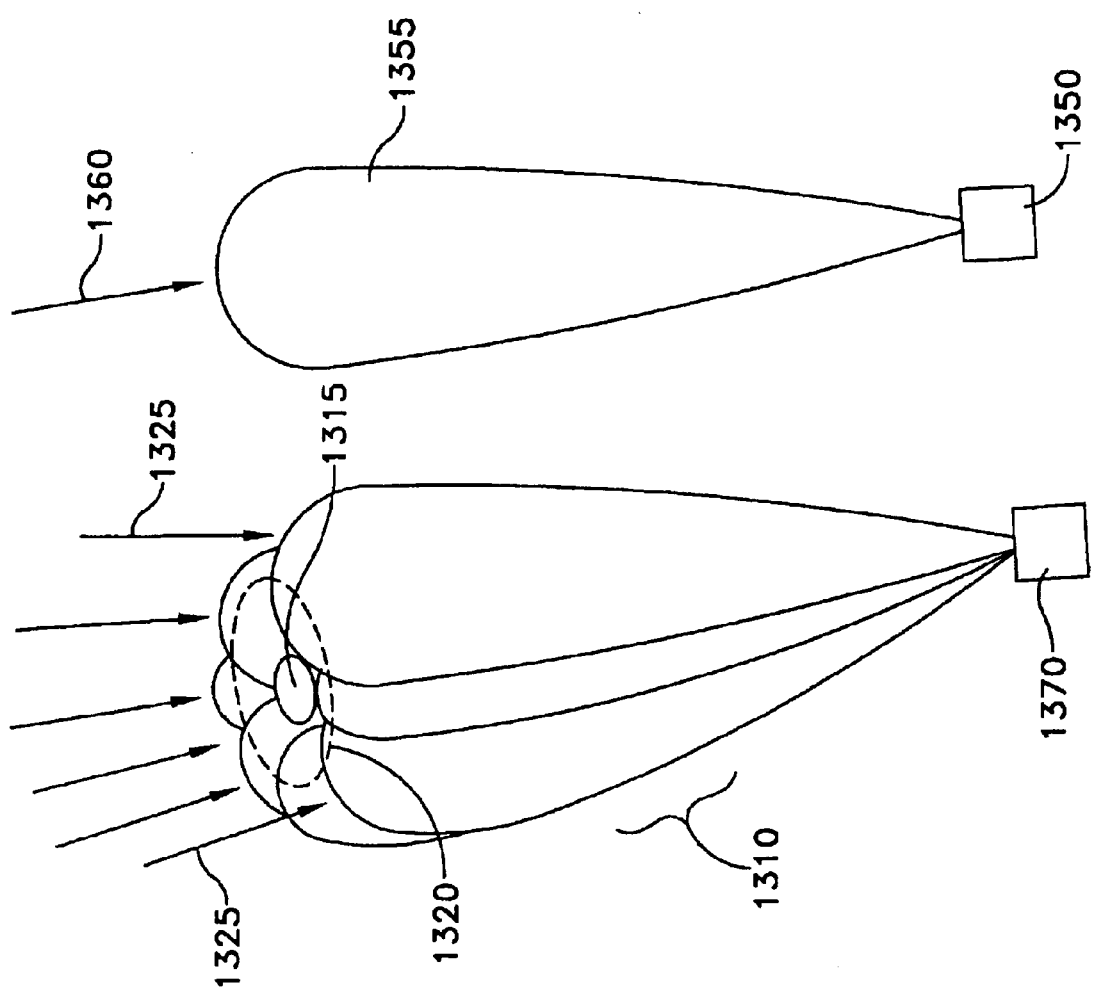
FIG. 13 illustrates a prospective view of a system using a spatially-notched antenna pattern in accordance with the principles of the invention.

In another aspect of the invention, the antenna pattern of a receiving system may be mechanically positioned or electronically altered such that a spatial null is created around the direct signal path of the desired signal transmitted or reflected from the target aircraft. FIG. 13 illustrates a spatial antenna pattern 1310 electronically altered to create a central spatial null 1315 to avoid reception of a direct beam of a desired signal transmitted or reflected from the target aircraft. In this illustrated aspect of the invention antenna pattern 1310 is electronically altered using known phase addition and difference circuits to fabricate antenna pattern 1310 to exhibit an annulus of sensitivity 1320 about spatial null or reception hole 1315. More specifically, an annulus of sensitivity describes a region of interest that includes possible (weak) signal paths from atmospheric refractions of interest but excluding the direct, intense path from the source (still used as a source for our "reference" signal).

The creation of spatial null 1315 around the direct path of the desired signal is analogous to viewing the sun's cornea in that a disk, appropriately sized and placed in the direct path of the sunlight, blocks the extremely bright, directly viewable sunlight and enables viewing of lower-powered surrounding cornea. This method of viewing the cornea is necessary due to the exceedingly large optical dynamic range presented to the viewer with the much higher power of the directly viewed sunlight washing-out and/or obscuring the lower power view of the cornea. Similarly, formation of null 1315 and annulus 1320 of pattern 1310 in accordance with an aspect of the present invention permits lower power refracted signals 1325 to be detected and processed by the corresponding receiving system.

In a preferred embodiment, the antenna off-axis position or phase-altered pattern fabricates a spatial-nullity 1315 sized to substantially eliminate, prevent, or preclude reception of signal energy from the direct path. Hence, rather than processing a direct path signal, lower power refracted signals 1325 are capable of being detected and processed by the corresponding receiving system.

FIG. 13 further illustrates an exemplary system operation of a system using spatial-nulling antennas. In this system, an antenna system of one receiving system, for example 1350, is selected as a reference and includes an antenna pattern 1355 directed to receive the desired signal 1360 along a direct path. Each of the remaining receiving systems, as represented by receiving system 1370, has an antenna pattern 1310 directed, positioned or electronically altered to contain spatial-null 1315 to receive lower power refracted signals 1325 for subsequent processing.

The use of a spatial-nulling antenna pattern to detect lower-power refracted signals 1325 is advantageous as it permits the reception of lower-powers signals that provide a greater measurement of phases changes induces by the wake or wind-shear environment. As should be understood, each of the antenna systems may be independently operated to maintain a spatial nullity about the direct path as the target aircraft continues along its flight path. In this case, receiving systems 1350 and 1370 are operating in cooperation in the angular tracking/alignment and the processing of the received data sense. Tracking of the signal source may be facilitated by the specific antenna implementation or otherwise obtained from an independent means.

Although this second embodiment of the invention has been described with regard to a ground-based system, it should be understood that the principles of the second embodiment are applicable to the airborne system shown in FIG. 12. Furthermore, it would be understood that the antenna pattern of the receiving system may be mechanically biased away from the direct signal (off-axis) to prevent or avoid reception of the direct signal energy. Thus, the phase reference path remains staring at the signal source in order to optimize the integrity of derived phase measurements. The spatial apertures of adjacent signal paths however are managed in a way to essentially spatially null electromagnetic signals directly from the source, while remaining spatially uncontaminated by other signals or reflections of the source from non-relevant objects.

In one embodiment, the adjacent path spatial pattern would image a "halo" of angularity surrounding the source such as to be able to receive electromagnetic energy over signal paths close in angularity to the signal source, yet avoiding the high signal amplitude path directly from the source. This embodiment, using spatial nulling of the adjacent path, emphasizes the detection of wake induced refractivity wherein the wake bends the propagation path from source to receiver by the relatively subtle amounts induced by anticipated wake induced pressure, temperature and humidity non-homogeneities. By blocking the direct receive path, the adjacent signal vectors are dominated by wake induced effects, thereby enhancing the sensitivity of the differential measurements leading to wake detection. Nullifying the direct signal path signals allows the receiver dynamic range to be centered on these more subtle signal modulation effects and provides a high contrast or gain for detecting these signals. The receiver antenna array, in conjunction with phase coherent signal beamforming, provides the mechanism for both nullifying direct path signals and resolving the angularity of signals arriving in angles close to the direct path. Electronic processing associated with the recording of continuous absolute spatial angle over time of the modulations of the received signals at relatively close angles.

It is also contemplated that the halo could itself be spatially broken down into separate zones and processed independently in order to localize turbulence or further enhance the detectability of a wake.

Although the invention has been described in a preferred form with a certain degree of particularity, it is understood that the present disclosure of the preferred form has been made only by way of example, and that numerous changes in the details of construction and combination and arrangement of parts may be made without departing from the spirit and scope of the invention as hereinafter claimed. It is intended that the patent shall cover by suitable expression in the appended claims, whatever features of patentable novelty exist in the invention disclosed.

We claim:

1. A system for determining atmospheric disturbance that may exist in front of an aircraft comprising:

a plurality of sensor arrays, each array containing at least one sensor element including an antenna having a known beam pattern, and concurrently receiving at least one signal;

a receiving system in communication with a corresponding one of said at least one sensor element in each of said plurality of sensor arrays, said receiving system operable to isolate a same signal from said at least one received signal in each of said plurality of sensor arrays;

means for determining a phase value for each of said same signals;

means for determining a rate of phase change for selected subsets of said same signals;

means for indicating turbulence when said rate of phase change exceeds a known threshold associated with selected subsets of said same received signals.

2. The system as recited in claim 1, wherein said known pattern associated with at least one said sensor arrays is electronically configured to receive substantially a maximum signal energy of said same signal.

3. The system as recited in claim 1, wherein said known pattern associated with at least one said sensor arrays is electronically configured to create a spatial null about substantially a maximum signal energy of said same signal.

4. The system as recited in claim 1, wherein said known pattern associated with at least one said sensor arrays is mechanically positioned to receive substantially a maximum signal energy of said same signal.

5. The system as recited in claim 1, wherein said known pattern associated with at least one said sensor arrays is mechanically positioned to create a spatial null about substantially a maximum signal energy of said same signal.

6. A method for determining air turbulence which can undesirably affect the operation of an aircraft subjected to said turbulence comprising the steps of:

receiving via a plurality of sensor arrays, a signal at a predetermined frequency in an area where said turbulence is expected, each array containing at least one sensor element, arranged in a known pattern for concurrently receiving said predetermined frequency signal;

processing said received signal at a receiving system corresponding to each of said at least one sensor elements;

determining a phase value for each received signal;

determining a rate of phase change for selected subsets of said received signals;

detecting a phase change in said received signal due to turbulence;

comparing said detected phase change with a threshold value; and indicating the presence of said turbulence when said detected phase change exceeds said threshold value.

7. The method as recited in claim 6, wherein said known pattern associated with at least one said sensor arrays is electronically configured to receive substantially a maximum signal energy of said same signal.

8. The method as recited in claim 6, wherein said known pattern associated with at least one said sensor arrays is electronically configured to create a spatial null about substantially a maximum signal energy of said same signal.

9. The method as recited in claim 6, wherein known pattern associated with at least one said sensor arrays is mechanically positioned to receive substantially a maximum signal energy of said same signal.

10. The method as recited in claim 6, wherein said known pattern associated with at least one said sensor arrays is mechanically positioned to create a spatial null about substantially a maximum signal energy of said same signal.

* * * * *